(12) United States Patent
Cheung et al.

(10) Patent No.: US 10,132,463 B2
(45) Date of Patent: Nov. 20, 2018

(54) LED AUTOMOTIVE TAIL LAMP SET

(75) Inventors: Chi Fai Cheung, Kowloon (CN);
Sandy To, Kowloon (CN); Wing Bun Lee, Kowloon (CN); Jin Bo Jiang, Kowloon (CN); Bo Wang, Kowloon (CN)

(73) Assignee: The Hong Kong Polytechnic University, Hong Kong (HK)

(*) Notice: Subject to any disclaimer, the term of this patent is extended or adjusted under 35 U.S.C. 154(b) by 146 days.

(21) Appl. No.: 12/222,825

(22) Filed: Aug. 18, 2008

(65) Prior Publication Data
US 2010/0039830 A1    Feb. 18, 2010

(51) Int. Cl.
| | |
|---|---|
| *F21V 5/00* | (2018.01) |
| *F21V 5/04* | (2006.01) |
| *F21V 7/00* | (2006.01) |
| *G02B 19/00* | (2006.01) |
| *F21S 43/14* | (2018.01) |
| *F21S 43/20* | (2018.01) |
| *F21S 43/31* | (2018.01) |
| *F21Y 115/10* | (2016.01) |

(52) U.S. Cl.
CPC ............ *F21V 5/04* (2013.01); *F21S 43/14* (2018.01); *F21S 43/26* (2018.01); *F21S 43/315* (2018.01); *F21V 7/0091* (2013.01); *G02B 19/0028* (2013.01); *G02B 19/0061* (2013.01); *F21Y 2115/10* (2016.08)

(58) Field of Classification Search
USPC .................................. 362/311.02, 244–245
See application file for complete search history.

(56) References Cited

U.S. PATENT DOCUMENTS

| | | | | |
|---|---|---|---|---|
| 2,254,962 | A * | 9/1941 | Bitner et al. .................. | 362/327 |
| 6,367,950 | B1 * | 4/2002 | Yamada et al. ............... | 362/245 |
| 6,724,543 | B1 * | 4/2004 | Chinniah et al. ............. | 359/718 |
| 6,814,470 | B2 * | 11/2004 | Rizkin .................. | F21V 7/0091 |
| | | | | 362/240 |
| 2005/0152153 | A1 * | 7/2005 | Amano ......................... | 362/520 |
| 2006/0072313 | A1 * | 4/2006 | Magarill ....................... | 362/227 |
| 2007/0263390 | A1 * | 11/2007 | Timinger et al. ............. | 362/308 |
| 2009/0225552 | A1 * | 9/2009 | Chen ............................. | 362/333 |

FOREIGN PATENT DOCUMENTS

JP    2007-265688    10/2007

* cited by examiner

*Primary Examiner* — Sean Gramling
(74) *Attorney, Agent, or Firm* — Muncy, Geissler, Olds & Lowe, P.C.

(57) ABSTRACT

The present invention relates to LED lamps suitable for forming automotive lighting systems, made of high power lambertian LEDs and a TIR collimator lens. In the present invention, a novel TIR collimator lens is developed to collect the light emitted from the LED source and through a pillow lens array; redistribution occurs to form a light pattern meeting ECE requirements.

4 Claims, 18 Drawing Sheets

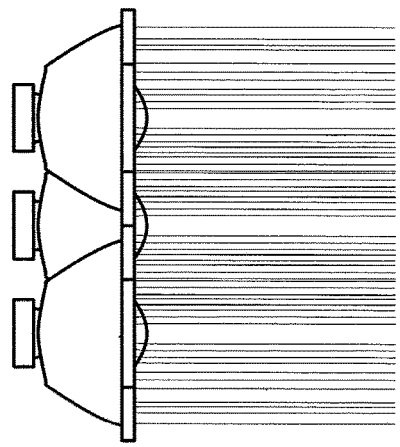
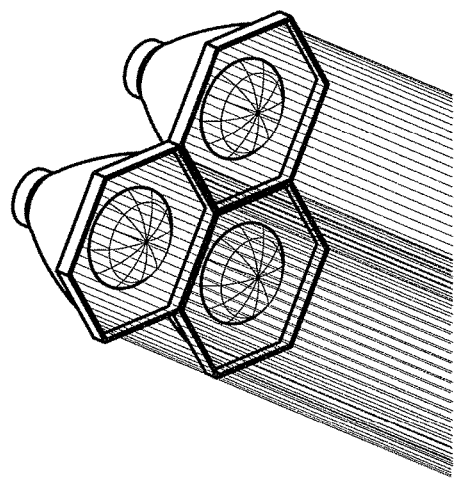
FIG. 4A  FIG. 4B
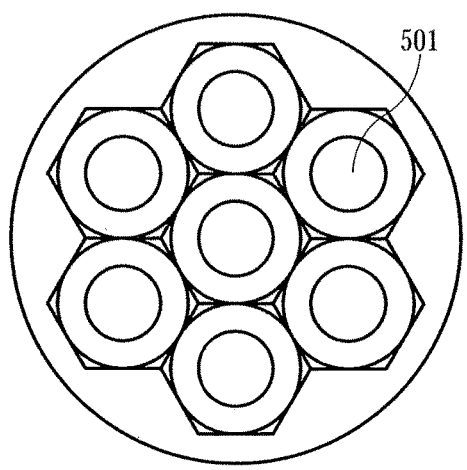
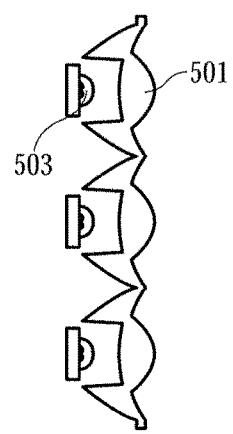
FIG. 5A  FIG. 5B

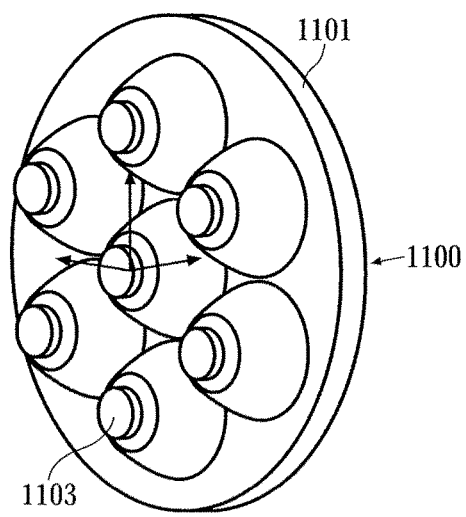 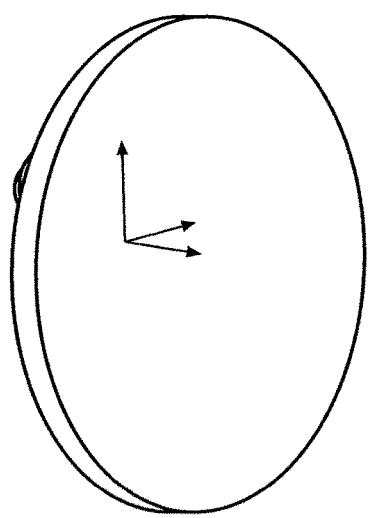
*FIG. 11A*  *FIG. 11B*

LED AUTOMOTIVE TAIL LAMP SET

BACKGROUND

Traditional tail lamps use halogen filament light sources. With the rapid and steady increase of the LED flux during the last decade, LEDs are not widely used in automotive lighting systems for their durability, reliability, longer life, quicker response time, lower power consumption, compact package size, availability of red, white, and amber colors naturally, and more design flexibility offering different styling options. However, there are challenges with respect to the use of LEDs due to their relatively low flux output.

In the current market, LED tail lamps almost do not form a light pattern, rather several LEDs are assembled together. This does not allow for maximum efficiency.

It is an object of the present invention to overcome the disadvantages and problems in the prior art.

DESCRIPTION

The present invention relates to LED lamps suitable for forming automotive lighting systems, made of high power lambertian LEDs and a TIR collimator lens. In the present invention, a novel TIR collimator lens is developed to collect the light emitted from the LED source and through a pillow lens array; redistribution occurs to form a light pattern meeting ECE regulations.

These and other features, aspects, and advantages of the apparatus and methods of the present invention will become better understood from the following description, appended claims, and accompanying drawings, as discussed below.

The following description of certain exemplary embodiment(s) is merely exemplary in nature and is in no way intended to limit the invention, its application, or uses. As used herein, a "lambertian LED" refers to a light emitting diode that obeys Lambert's cosine law, defined as the radiant intensity directly proportional to the cosine of an angle Θ between the observer's line of sight and the surface normal.

BRIEF DESCRIPTION OF THE DRAWINGS

FIGS. 4A-4B show light from a lamp system having 3 lamps.

FIGS. 5A-5B show another embodiment of a lamp system having 7 lamps.

FIGS. 11A-11B show a lamp system involving LED lamps.

DETAILED DESCRIPTION

Figure 1A:
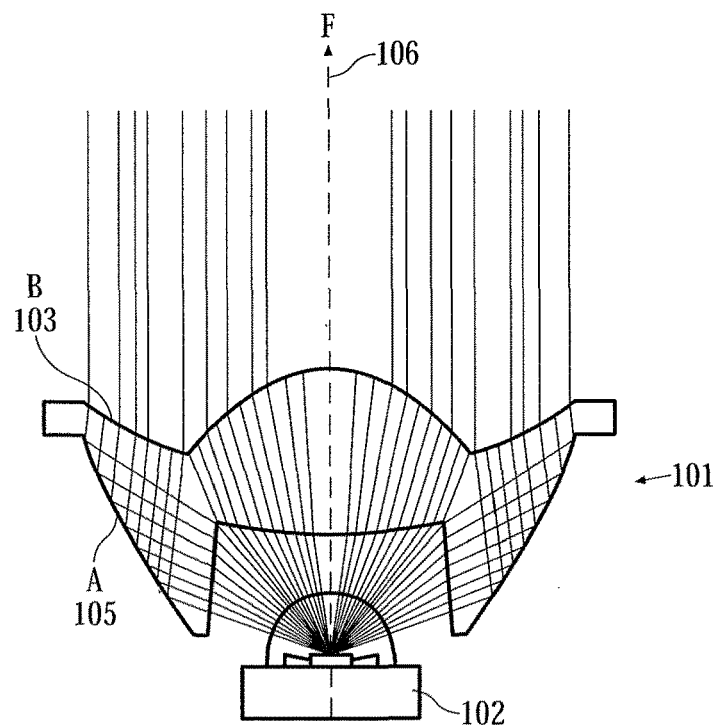
FIG. 1A is a side view of a lamp unit according to an exemplary embodiment of the invention.

FIG. 1 is an embodiment of the present lamp unit 101 to be used in an automotive lighting system, having an LED housing unit 102 and a total internal reflection (TIR) lens 104 with a front 103 and a back 105. FIG. 1A is a side view of the unit 101. The TIR lens unit is constituted by an outside TIR surface and a control aspheric collimating lens. The design of the TIR lens can be defined as a total internal reflection lens having two connected mirror image sides, whereby each side has a convex dome attached to an upward sloping face leveling off to form a lip, whereby the bottom side of the lip is attached to a downward sloping face attached to a vertical face, and then to a horizontal convex face. A LED housing unit 102 is positioned below the lens. Through the design of the lamp unit, light from an LED within the LED housing unit 102 is forwarded to a distance "F" 106. Hence, the light from the LED transmits through the surfaces "A" 105 and "B" 103 and are collimated.

Figure 1B:
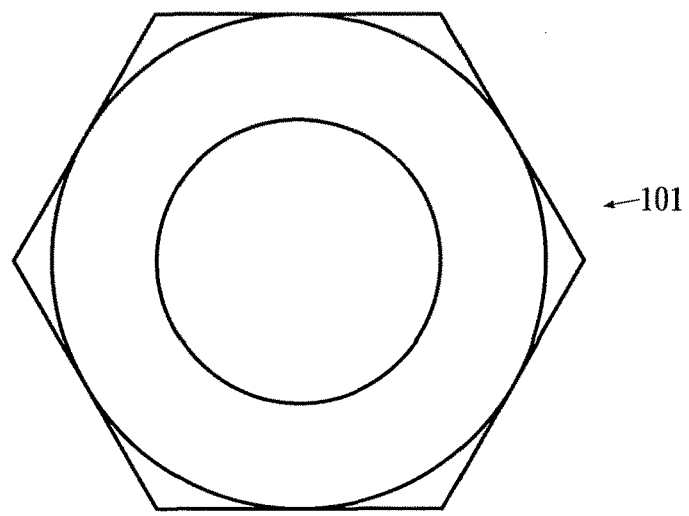
FIG. 1B is a top view of the lamp unit.

As shown in FIG. 1B, the lamp 101 is hexagon in shape.

Figure 2A:
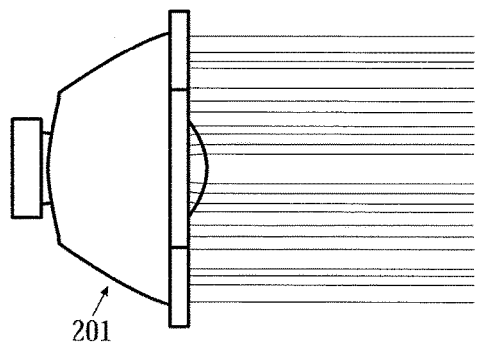
FIG. 2A is a side three-dimensional view of the present lamp.
Figure 2B:
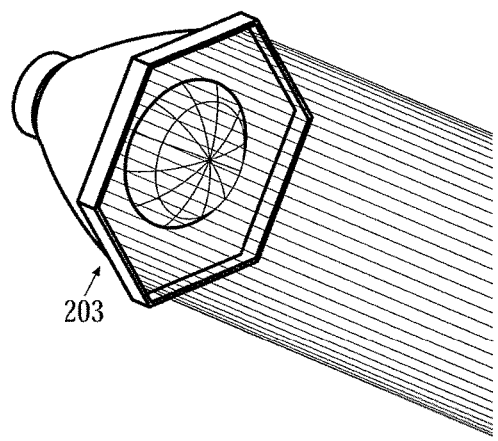
FIG. 2B is a perspective three-dimensional view of the present lamp.

FIGS. 2A-2B represent a three dimensional view of the present lamp, during use, i.e., light exiting the lamp unit. (a) is a side view and (b) is a perspective view.

Figure 3A:
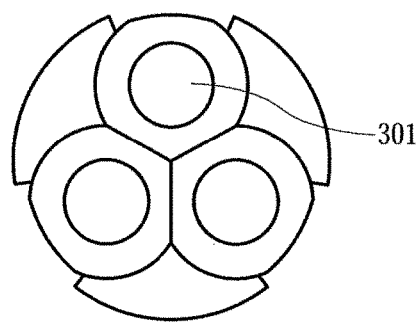
FIGS. 3A-3B show an embodiment of a lamp system having lamps.
Figure 3B:
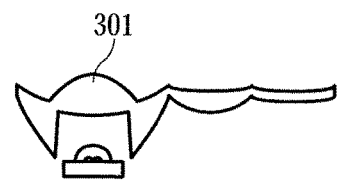

FIGS. 3A-3B is an embodiment of a lamp system of the present system, made of 3 lamps 301 of the present invention. This embodiment is useful in an automotive lighting systems, specifically backup lights and turn signal lights.

FIGS. 4A-4B show light from a lamp system having 3 lamps, of the present invention, sent out to a distance.

FIGS. 5A-5B show another embodiment of a lamp system to be used in an automobile lighting system, in accordance with the present invention. In this embodiment, 7 lamps are utilized in the lamp system. This embodiment is suitable for brake light and park light.

Figure 6A:
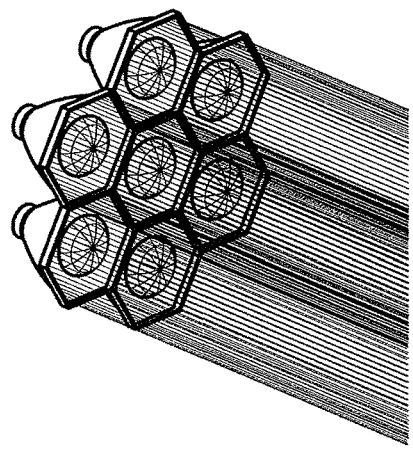
FIGS. 6A-6C show a brake light or park light lamp system.
Figure 6B:
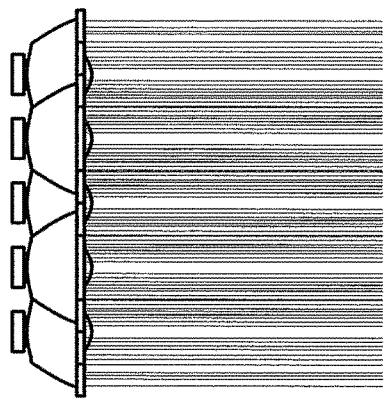
Figure 6C:
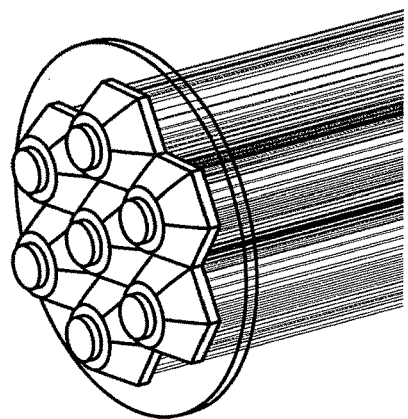

FIGS. 6A-6C exhibits a brake light or park light lamp system of the present invention, providing light for a distance.

Lenses are placed over the lamp systems, thereby affecting the reflectance and scattering of the light sent from the lamp systems. Lenses can have a variety of designs, for example lenses having refractive and/or scattering pattern. Designs, such as those described in U.S. Pat. No. 6,818,276, incorporated herein by reference, are suitable for use herein.

Scattering of the light delivered from the present lamp system can be described as follows:

$$\sin\alpha_1 = \frac{1}{n}\sin\alpha$$

$$\beta = \alpha_1 + \alpha_2, \alpha_2 = \beta - \alpha_1$$

$$n\sin(\beta - \alpha_1) = \sin\beta$$

$$n(\sin\beta\cos\alpha_1 - \cos\beta\sin\alpha_1) = \sin\beta$$

$$\cos\alpha_1 = \frac{1}{n}\sqrt{n^2 - \sin^2\alpha}$$

$$n\left(\sin\beta \cdot \frac{1}{n}\sqrt{n^2 - \sin^2\alpha} - \cos\beta \cdot \frac{1}{n}\sin\alpha\right) = \sin\beta$$

-continued $$\sqrt{n^2 - \sin^2\alpha} - ctg\beta \cdot \sin\alpha = 1$$

$$ctg\beta = \frac{\sqrt{n^2 - \sin^2\alpha} - 1}{\sin\alpha} = 2\frac{\sqrt{R^2 - \left(\frac{L}{2}\right)^2}}{L}$$

$$R = \frac{L \cdot \sqrt{n^2 - 2\sqrt{n^2 - \sin^2\alpha} + 1}}{2\sin\alpha}$$

Figure 7:
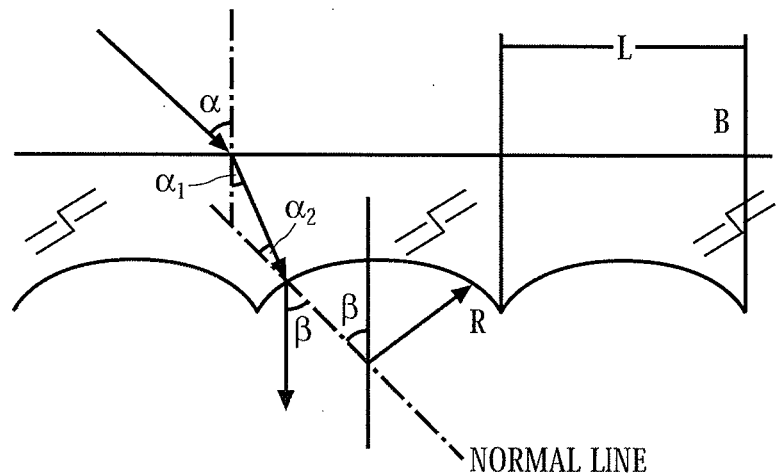
FIG. 7 shows a scattering pattern according to the present invention.

FIG. 7 sketches a scattering pattern according to the present invention.

Refractive light from the present lamp can be described as follows:

$$n\sin\alpha_2 = \sin\alpha$$

$$\alpha_1 = \beta - \alpha_2, \sin\beta = n\sin(\beta - \alpha_2), \sin\beta = n(\sin\beta\cos\alpha_2 - \cos\beta\sin\alpha_2)$$

$$n\cos\alpha_2 - nctg\beta\sin\alpha_2 = 1$$

$$ctg\beta = \frac{\cos\alpha_2 - \frac{1}{n}}{\sin\alpha_2}$$

$$ctg\beta = \frac{\sqrt{1 - \frac{1}{n^2}\sin^2\alpha} - \frac{1}{n}}{\frac{1}{n}\sin\alpha} = \frac{\sqrt{n^2 - \sin^2\alpha} - 1}{\sin\alpha} = \frac{L}{H}$$

$$H = \frac{L\sin\alpha}{\sqrt{n^2 - \sin^2\alpha} - 1}$$

Figure 8:
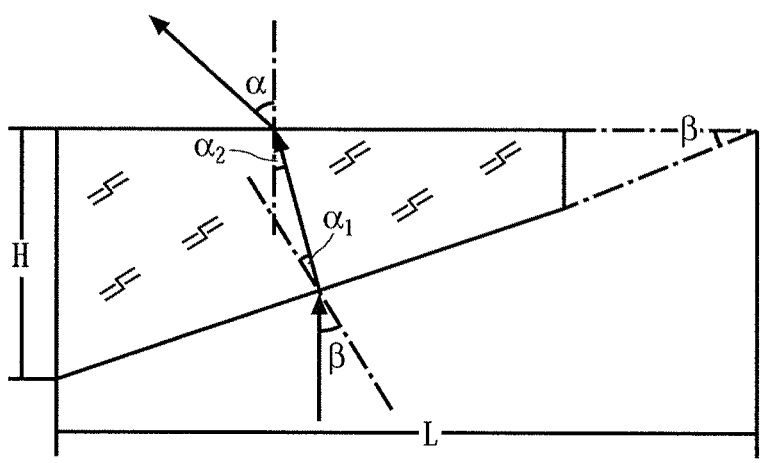
FIG. 8 shows a refractive pattern according to the present invention.

FIG. 8 sketches a refractive pattern according to the present invention.

Figure 9:
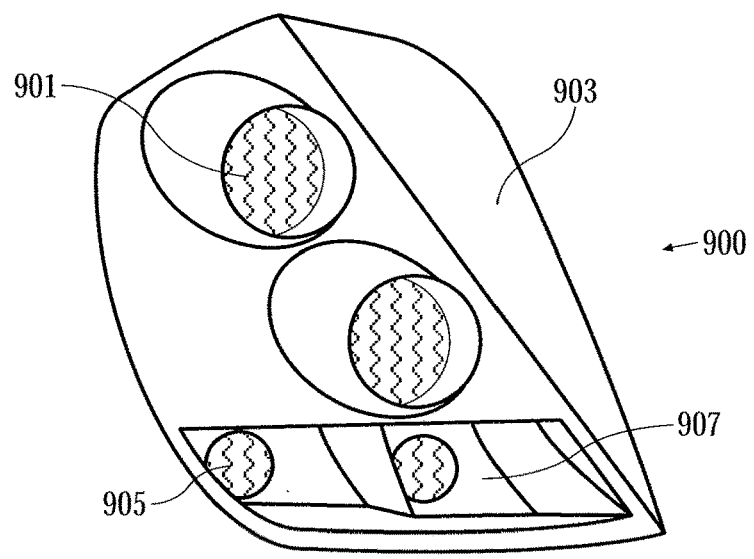
FIG. 9 is an embodiment of an automotive lighting system.

FIG. 9 is an embodiment of an automotive lighting system 900 possessing the present lamp system. The lighting system 900 includes a brake light 901, park light 903, turn signal light 905, and backup light 907.

Figure 10:
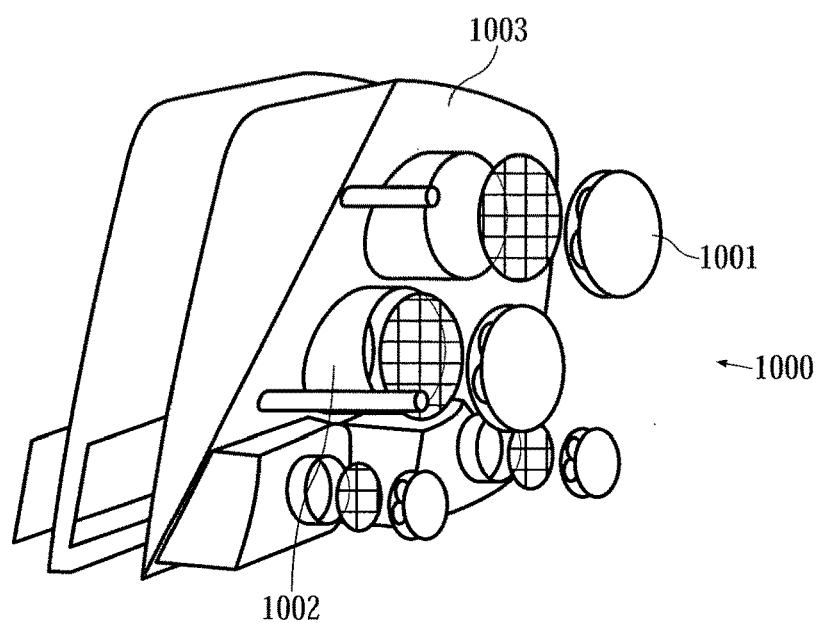
FIG. 10 is a schematic breakdown of an automotive lighting system.

FIG. 10 is a schematic breakdown of an automotive lighting system 1000, whereby the lamp systems 1001 fit within compartments 1002 of the lighting system housing 1003.

FIGS. 11A-11B shows a lamp system 1100 of the present invention, including several LED lamps 1103 made in accordance with the present invention and a lens 1101 for scattering, reflecting, or scattering and reflecting the LED light. In this particular embodiment, 7 LED lamps are utilized.

3 or 7 lamp units are not the unique choice for the automobile lamp tail; 3 or 7 lamp units are just one of our many combinations. 4, 5 or 8, 9 lamp units can be accomplished to fit the requirement of the automobile lamp tail set.

Example

Testing was performed on several of the lamp systems within an automotive lighting systems.

Figure 12A:
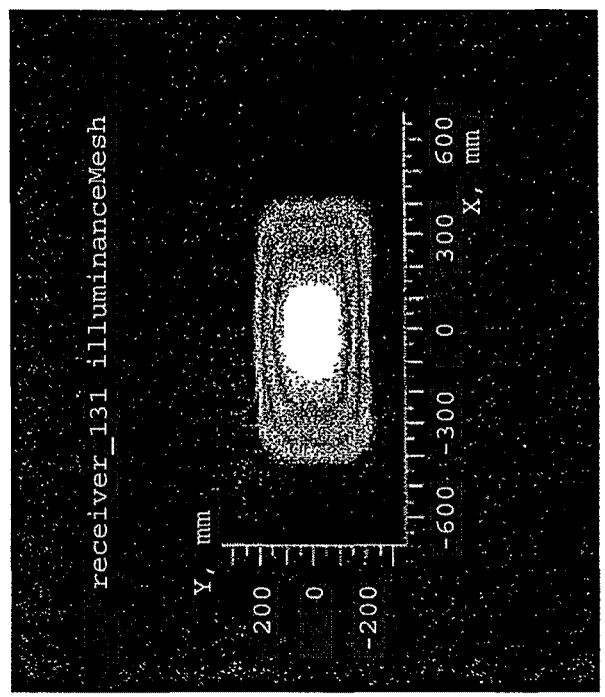
FIGS. 12A-12C show the testing of a brake and parking light of an automobile, made from a lamp system and lamps.
Figure 12B:
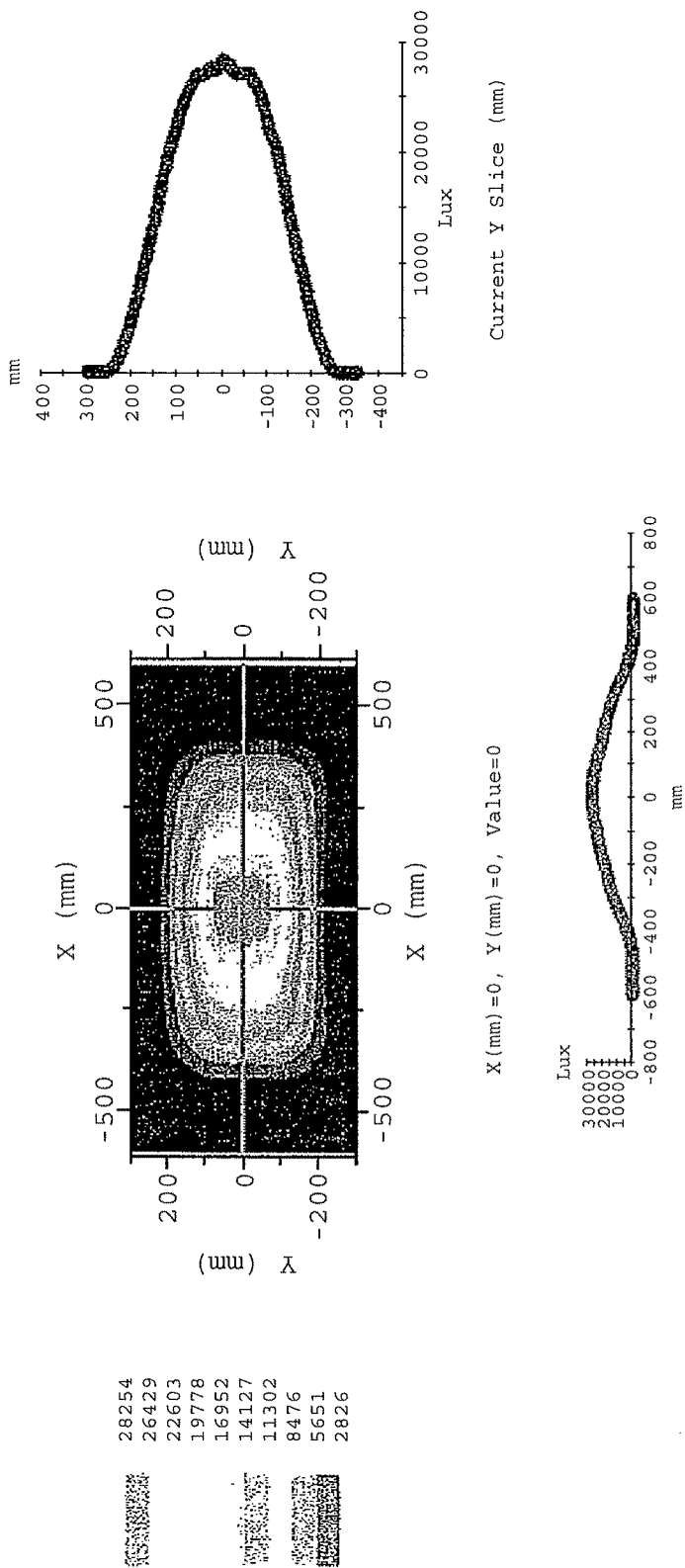
Figure 12C:
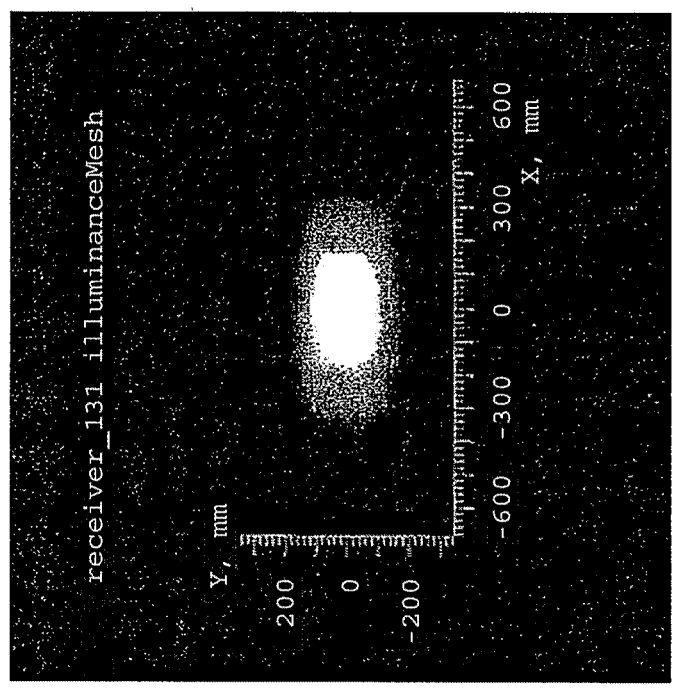
Figure 13A:
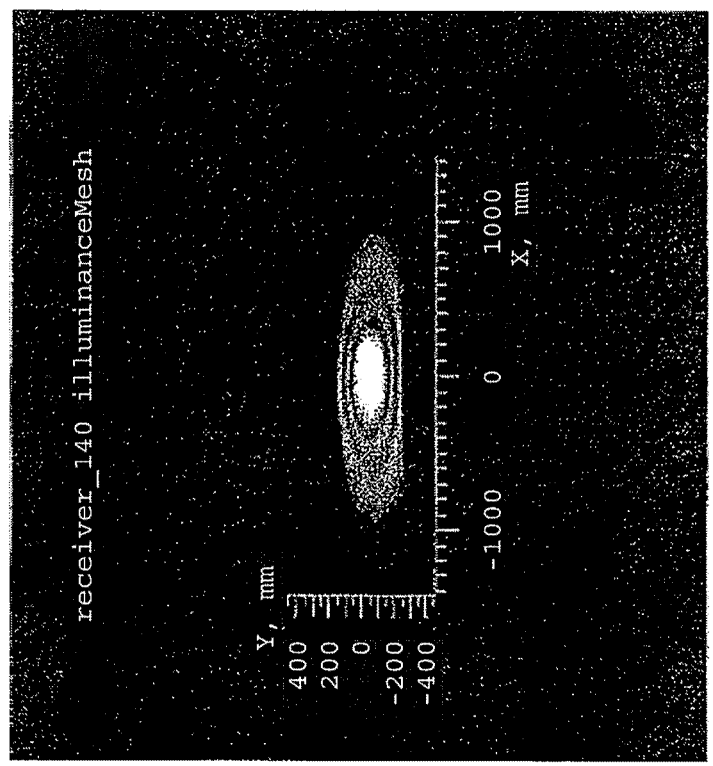
FIGS. 13A-13D exhibit the testing of a backup light of an automobile, made from a lamp system and lamps.
Figure 13B:
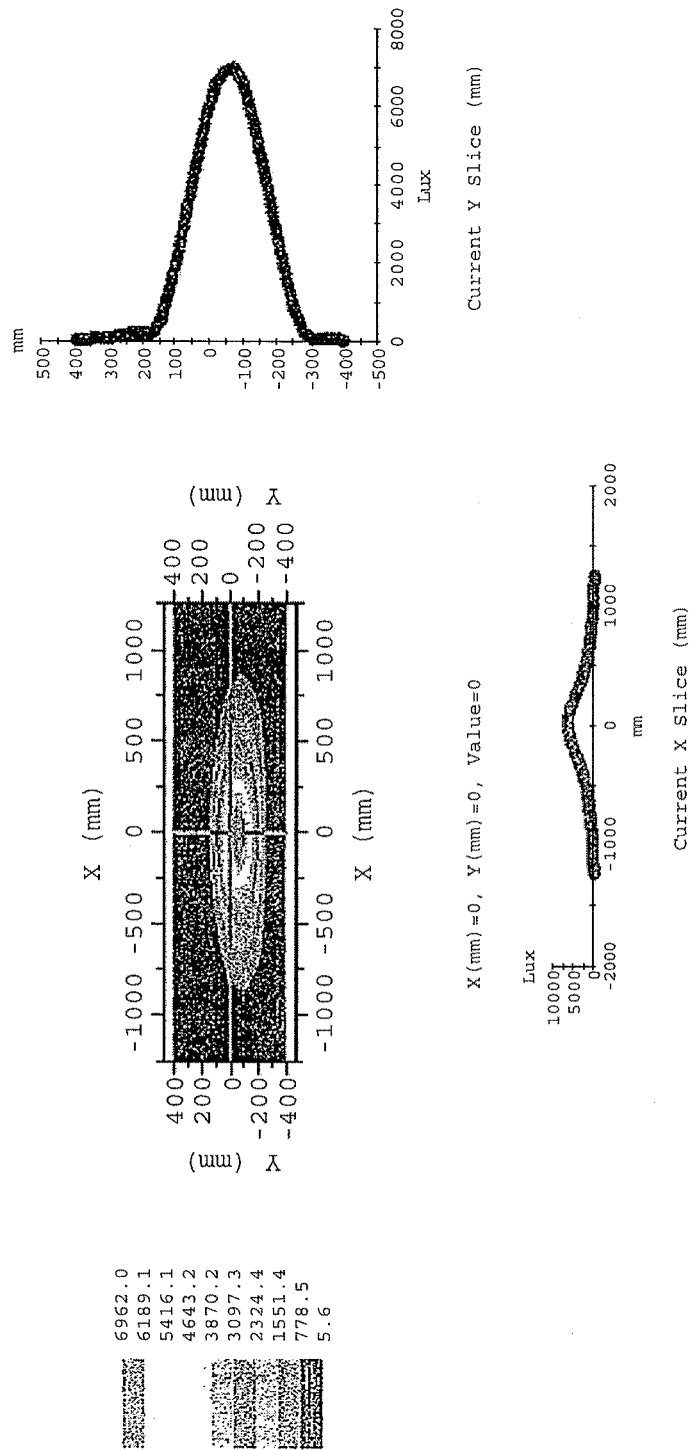
Figure 13C:
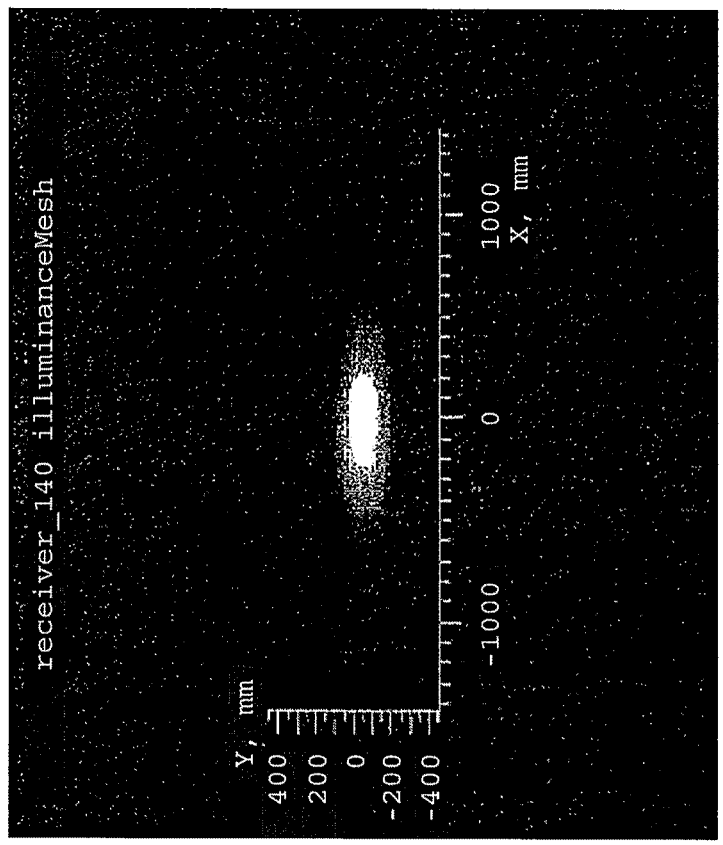
Figure 13D:
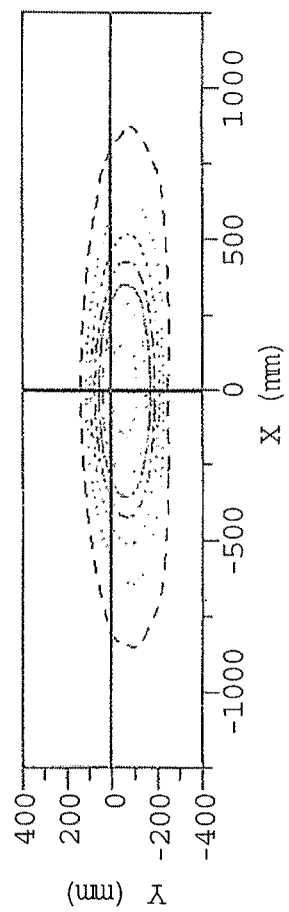
Figure 14A:
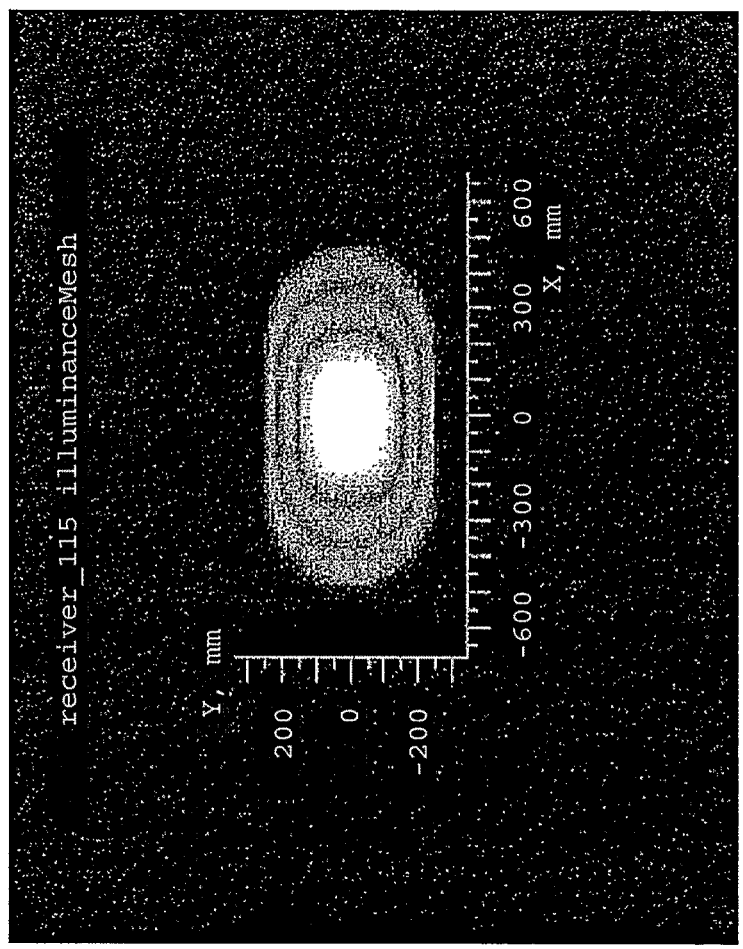
FIGS. 14A-14D exhibit the testing of a turn signal light of an automobile, made from a lamp system and lamps.
Figure 14B:
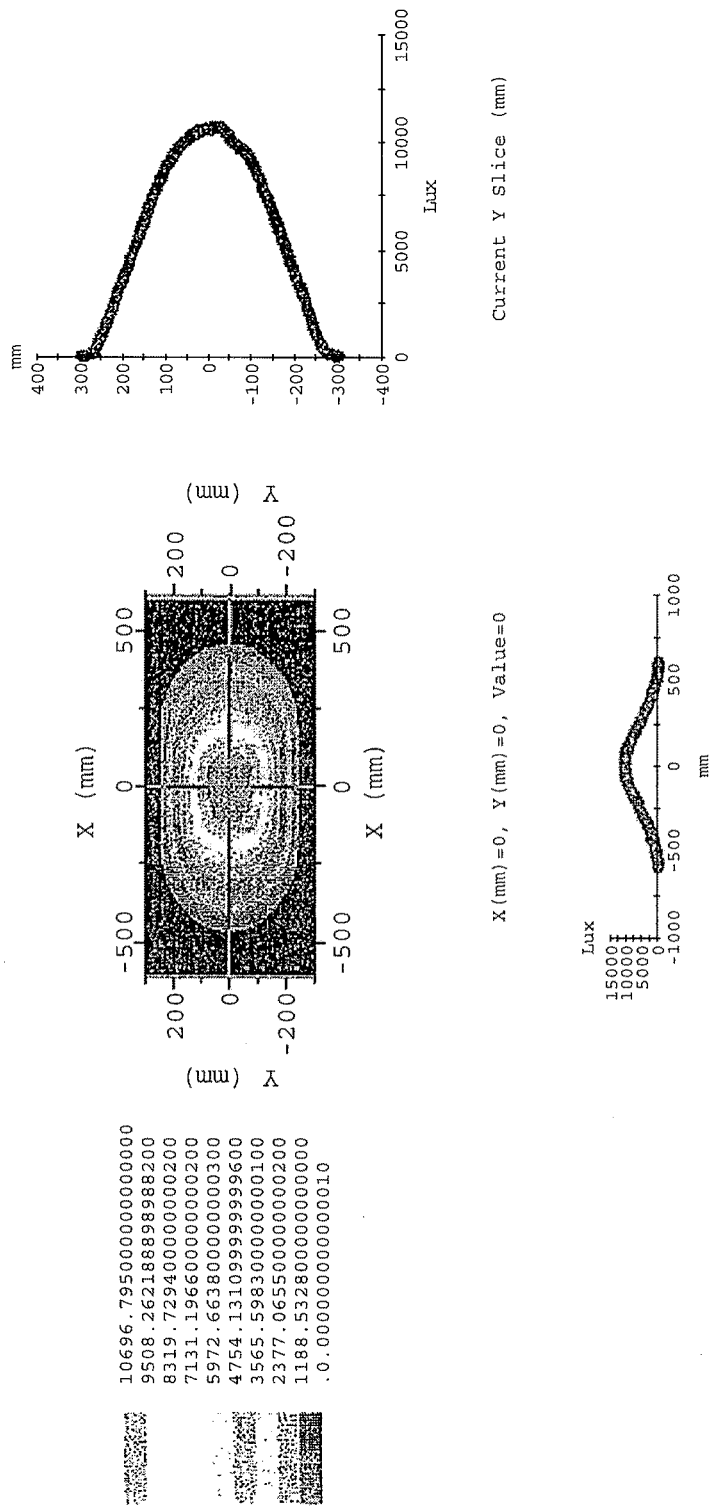
Figure 14C:
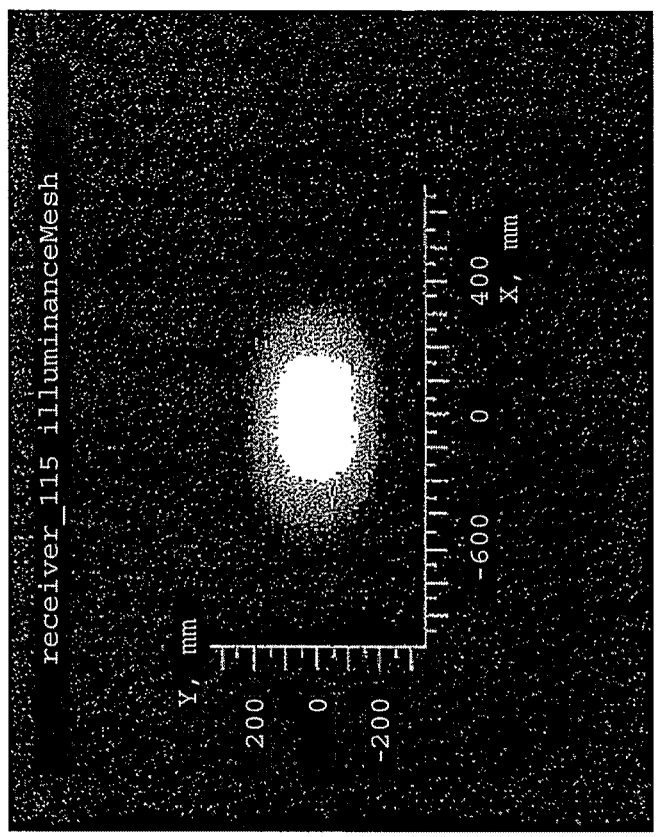
Figure 14D:
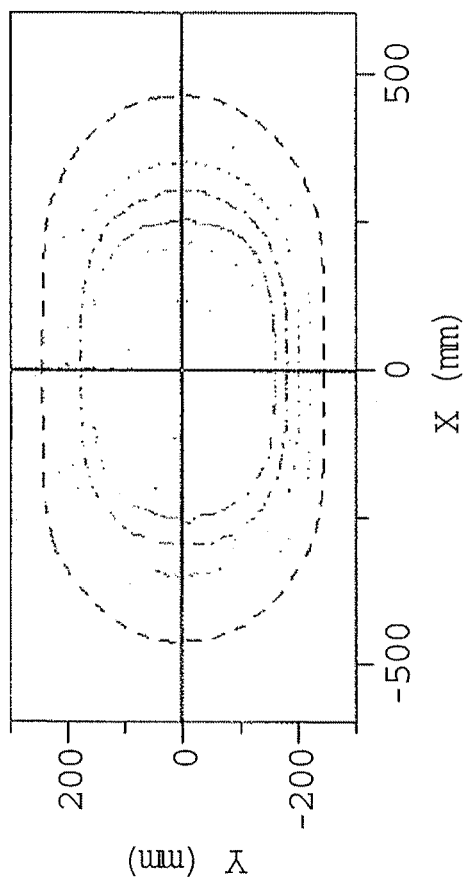

FIGS. 12A-12C exhibit the testing of a brake and parking light of an automobile, made from a lamp systems and lamps of the present invention. Table 1 shows the results of the testing and how they match up against ECE requirements.

TABLE 1

| Testing point | | Requirement (ECE) Min | Max | Luminous intensity (Unit: cd) | Pass or Negative |
|---|---|---|---|---|---|
| 10U/D | 5L | 8 | 100 | 13.9 | Pass |
|  | V | — |  | 14.6 | Pass |
|  | 5R | 8 |  | 13.4 | Pass |
| 5U/D | 20L | 4 | 100 | 8.4 | Pass |
|  | 10L | 8 |  | 30.0 | Pass |
|  | V | 28 |  | 39.3 | Pass |
|  | 10R | 8 |  | 29.7 | Pass |
|  | 20R | 4 |  | 8.5 | Pass |
| H | 10L | 14 | 100 | 33.8 | Pass |
|  | 5L | 36 |  | 40.1 | Pass |
|  | V | 40 |  | 45.2 | Pass |
|  | 5R | 36 |  | 41.5 | Pass |
|  | 10R | 14 |  | 33.3 | Pass |

FIGS. 13A-13D exhibit the testing of a backup light of an automobile, made from a lamp system and lamps of the present invention. Table 2 shows the results of the testing and how they match up against ECE requirements.

TABLE 2

| Testing point | | Requirement (ECE) Min | Max | Luminous intensity (Unit: cd) | Pass or Negative |
|---|---|---|---|---|---|
| 10 U/D | 5 L | 10 | 350 | 22.8 | Pass |
|  | V | — |  | 24.8 | Pass |
|  | 5 R | 10 |  | 23.0 | Pass |
| 5 U/D | 20 L | 5 | 350 | 13.5 | Pass |
|  | 10 L | 10 |  | 36.3 | Pass |
|  | V | 35 |  | 43.9 | Pass |
|  | 10 R | 10 |  | 38.0 | Pass |
|  | 20 R | 5 |  | 13.8 | Pass |
| H | 10 L | 17.5 | 350 | 36.7 | Pass |
|  | 5 L | 45 |  | 49.0 | Pass |
|  | V | 50 |  | 54.4 | Pass |
|  | 5 R | 45 |  | 48.9 | Pass |
|  | 10 R | 17.5 |  | 41.9 | Pass |

FIGS. 14A-14D exhibit the testing of a turn signal light of an automobile, made from a lamp system and lamps of the present invention. Table 3 shows the results of the testing and how they match up against ECE requirements.

TABLE 3

| Testing point | | Requirement (ECE) Min | Max | Luminous intensity (Unit: cd) | Pass or Negative |
|---|---|---|---|---|---|
| 10U | 10L | 10 | 300 | 15.4 | Pass |
|  | V | 15 |  | 23.0 | Pass |
|  | 10R | 10 |  | 13.9 | Pass |
| 5U | 45L | 15 | 300 | 26.7 | Pass |
|  | 10L | 20 |  | 60.1 | Pass |
|  | V | 25 |  | 83.5 | Pass |
|  | 10R | 20 |  | 61.5 | Pass |
|  | 45R | 15 |  | 20.6 | Pass |
| H and 5D | 45L | 15 | 300 | 24.5 | Pass |
|  | 30L | 25 |  | 52.6 | Pass |
|  | 10L | 50 |  | 86.4 | Pass |
|  | V | 80 |  | 90.5 | Pass |
|  | 10R | 50 |  | 85.7 | Pass |
|  | 30R | 25 |  | 50.9 | Pass |
|  | 45R | 15 |  | 25.1 | Pass |
| H-H down |  |  | 600 | — | Pass |

Having described embodiments of the present system with reference to the accompanying drawings, it is to be understood that the present system is not limited to the precise embodiments, and that various changes and modifications may be effected therein by one having ordinary skill in the art without departing from the scope or spirit as defined in the appended claims.

In interpreting the appended claims, it should be understood that:

a) the word "comprising" does not exclude the presence of other elements or acts than those listed in the given claim;

b) the word "a" or "an" preceding an element does not exclude the presence of a plurality of such elements;

c) any reference signs in the claims do not limit their scope;

d) any of the disclosed devices or portions thereof may be combined together or separated into further portions unless specifically stated otherwise; and e) no specific sequence of acts or steps is intended to be required unless specifically indicated.

The invention claimed is:

1. An automotive lamp unit comprising:
   a lamp unit array consisting of three lamp units arranged in a triangle configuration, the lamp units being assembled such that light emitted from the lamp units is parallel, each lamp unit, comprising:
      a light source;
      a first lens piece having a first face through which a first emission of light from the light source enters, and a convex dome face through which the first emission of light leaves in a parallel collimated manner; and
      a second lens piece having a first curved face from which a second emission of light from the light source reflects, the first curved face having a concave curvature such that the light reflecting therefrom has a virtual focal point, and a second curved face from which the second emission of light leaves the second lens piece, the second curved face having a concave curvature such that the second emission of light leaves the second lens piece in a parallel collimated manner and parallel to the first emission of light leaving the first lens piece,
   wherein the first and second lens pieces form a unitary lens assembly and are positioned above a starting emission point of rays of light from the light source such that the entire starting emission point of the rays of light from the light source is positioned below an entirety of the unitary lens assembly; and
   a scattering or refracting lens disposed over an output end of the lamp units,
   wherein the convex dome is directly connected to the second curved face.

2. The automotive lamp unit of claim 1, wherein the light source is a lambertian light emitting diode (LED) colored white, red, yellow, or orange.

3. The automotive lamp unit of claim 1, comprising first and second opposing sides, each side having a portion of the first lens piece and a portion of the second lens piece.

4. The automotive lamp unit of claim 1, wherein the lamp unit has three, and only three, lamp units arranged in a triangle configuration.

* * * * *